(12) United States Patent
Medina et al.

(10) Patent No.: US 10,681,707 B2
(45) Date of Patent: Jun. 9, 2020

(54) WIRELESS COMMUNICATION DEVICE AND METHOD

(71) Applicant: HUAWEI TECHNOLOGIES CO., LTD., Shenzhen, Guangdong (CN)

(72) Inventors: Daniel Medina, Munich (DE); Liang Hu, Shenzhen (CN); Holger Rosier, Munich (DE); Serkan Ayaz, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/783,552

(22) Filed: Oct. 13, 2017

(65) Prior Publication Data

US 2018/0054826 A1 Feb. 22, 2018

Related U.S. Application Data

(63) Continuation of application No. PCT/EP2015/058113, filed on Apr. 14, 2015.

(51) Int. Cl.
*H04W 72/12* (2009.01)
*H04B 7/08* (2006.01)
(Continued)

(52) U.S. Cl.
CPC ........ *H04W 72/082* (2013.01); *H04B 7/0857* (2013.01); *H04W 16/14* (2013.01);
(Continued)

(58) Field of Classification Search
CPC ............... H04W 72/082; H04W 16/14; H04W 72/1215; H04B 7/0857
See application file for complete search history.

(56) References Cited

U.S. PATENT DOCUMENTS 7,333,458 B2  2/2008 Cain
7,855,997 B2  12/2010 Adams et al.
(Continued)

FOREIGN PATENT DOCUMENTS

CN  101360321 A  2/2009
CN  102893657 A  1/2013
EP  2 020 786 B1  10/2012

OTHER PUBLICATIONS

International Search Report dated Dec. 18, 2015 in corresponding International Patent Application No. PCT/EP2015/058113, 6 pp.
(Continued)

*Primary Examiner* — Charles C Jiang
*Assistant Examiner* — Voster Preval
(74) *Attorney, Agent, or Firm* — Kilpatrick Townsend & Stockton LLP

(57) ABSTRACT

A wireless communication device comprises: a transceiver being configured to measure a plurality of interference powers associated with a plurality of radio resources; and a processor being configured to determine, on the basis of the plurality of interference powers, conflicting radio resources of the wireless communication device. The transceiver is further configured to transmit data identifying the conflicting radio resources of the wireless communication device to at least one other wireless communication device and to receive data identifying conflicting radio resources of the at least one other wireless communication device. The wireless communication device is configured to allocate at least one radio resource from the plurality of radio resources for communicating with the at least one other wireless communication device on the basis of the conflicting radio resources of the wireless communication device and the data identifying conflicting radio resources of the at least one other wireless communication device.

13 Claims, 11 Drawing Sheets

(51) Int. Cl.
*H04W 72/08* (2009.01)
*H04W 16/14* (2009.01)
*H04W 84/18* (2009.01)
*H04W 28/18* (2009.01)

(52) U.S. Cl.
CPC ......... *H04W 72/1215* (2013.01); *H04B 7/086* (2013.01); *H04W 28/18* (2013.01); *H04W 84/18* (2013.01)

(56) References Cited

U.S. PATENT DOCUMENTS

| | | | |
|---|---|---|---|
| 8,817,676 B2 | 8/2014 | Shao et al. | |
| 2005/0277443 A1* | 12/2005 | Ozluturk | H04B 7/026 455/562.1 |
| 2009/0081955 A1 | 3/2009 | Necker | |
| 2009/0109916 A1* | 4/2009 | Berg | H04W 72/0406 370/329 |
| 2009/0116430 A1 | 5/2009 | Bonta et al. | |
| 2011/0282989 A1* | 11/2011 | Geirhofer | H04W 8/005 709/224 |
| 2013/0237264 A1* | 9/2013 | Kasslin | H04W 16/14 455/509 |
| 2015/0148049 A1* | 5/2015 | Alberth, Jr. | H04W 72/082 455/450 |
| 2015/0215948 A1* | 7/2015 | Alsusa | H04W 72/082 370/329 |
| 2015/0264602 A1* | 9/2015 | Hageltorn | H04W 36/0016 455/436 |
| 2015/0373731 A1* | 12/2015 | Quan | H04W 16/10 370/329 |
| 2016/0050677 A1* | 2/2016 | Cheng | H04W 56/00 370/329 |
| 2016/0191228 A1* | 6/2016 | Chen | H04W 76/27 370/254 |
| 2016/0345250 A1* | 11/2016 | Agyapong | H04W 48/16 |
| 2017/0164374 A1 | 6/2017 | Geirhofer et al. | |

OTHER PUBLICATIONS

Written Opinion of the International Search Authority dated Dec. 18, 2015 in corresponding International Patent Application No. PCT/EP2015/058113, 7 pp.

Bao, L. et al., "Transmission Scheduling In Ad Hoc Networks With Directional Antennas", MOBICOM '02, Atlanta, Georgia, Sep. 23-26, 2002, XP001171455, 11 pp.

Grönkvist, Jimmi, "Interference-Based Scheduling in Spatial Reuse TDMA", Stockholm, Sweden, Sep. 2005, XP055236000, 147 pp.

Young, C. David, "USAP Multiple Access: Dynamic Resource Allocation for Mobile Multihop Multichannel Wireless Networking", IEEE 1999, pp. 271-275.

3GPP, "3rd Generation Partnership Project; Technical Specification Group Radio Access Network; Study on LTE Device to Device Proximity Services; Radio Aspects (Release 12)", Mar. 2014, 50 pp.

Cain et al., "A Link Scheduling and Ad Hoc Networking Approach Using Directional Antennas", IEEE, 2003, pp. 643-648.

Young, C. David, "USAP: A Unifying Dynamic Distributed Multichannel TDMA Slot Assignment Protocol," IEEE, 1996, pp. 235-239.

Ioannides et al., "Uniform Circular Arrays for Smart Antennas", IEEE Antennas and Propagation Magazine, vol. 47, No. 4, Aug. 2005, pp. 192-206.

Bettstetter et al., "Stochastic Properties of the Random Waypoint Mobility Model", Accepted for ACM/Kluwer Wireless Networks, Special Issue on Modeling and Analysis of Mobile Networks, Mar. 2003, 34 pp.

Bettstetter et al., "How Does Randomized Beamforming Improve the Connectivity of Ad Hoc Networks?", Diploma Thesis, Technical University of Munich (TUM), Munich, Germany, 2005, pp. 3380-3385.

International Search Report dated Dec. 18, 2015 in corresponding International Patent Application No. PCT/EP2015/058113.

\* cited by examiner

101

WIRELESS COMMUNICATION DEVICE AND METHOD

CROSS-REFERENCE TO RELATED APPLICATIONS

This application is a continuation of International Application No. PCT/EP2015/058113, filed on Apr. 14, 2015, the disclosure of which is hereby incorporated by reference in its entirety.

TECHNICAL FIELD

The present disclosure relates to a wireless communication device and method for communication in a wireless communication network. In particular, the present disclosure relates to a wireless communication device and method for communication in a Vehicle-to-Vehicle (V2V) communication network.

BACKGROUND

In wireless mobile ad hoc communication networks, such as V2V communication networks, the problem of radio resource allocation (or scheduling) has to be addressed, i.e., how to schedule radio transmissions in a wireless mobile ad hoc communication network with minimal interference.

In order to determine whether a radio resource may be used for data transmission in a wireless communication network, the following multiple access constraints must be taken into account: (c1) a node cannot transmit and receive at the same time; (c2) the signal-to-interference-plus-noise ratio (SINR) at every receiver must be above a certain desired level. These multiple access constraints are explained in more detail on the basis of the exemplary wireless communication network 200 shown in FIG. 2, where node i may wish to transmit to node j (unicast). In FIG. 2, solid dots represent transmitting nodes, hollow dots represent receiving nodes, solid lines denote desired communication and dotted lines denote undesired interference.

If, in the exemplary wireless communication network 200 shown in FIG. 2, node i is allowed to transmit to node j while node i receives from node k, node i's transmission may cause sufficient interference at node l to degrade communication over link (k,l). On the other hand, if node i chooses a radio resource to transmit to node j in which node m transmits to node n, node m's transmission may cause sufficient interference at node j to degrade communication over link (i, j).

In accordance with constraints (c1) and (c2), a given radio resource s may be allocated for data transmission from node i to node j if and only if: (1) the constraints c1 and c2 are satisfied for node i, i.e., (1a) node i is not scheduled to transmit or receive in radio resource s, and (1b) the interference caused by node i's transmission can be handled by every node l receiving in radio resource s, and (2) the constraints c1 and c2 are satisfied for node j i.e., (2a) node j is not scheduled to transmit or receive in radio resource s, and (2b) the total interference from all nodes m transmitting in radio resource s can be handled by node When a transmission from node i is intended for all its neighbors (i.e., a broadcast message), constraints 2a and 2b must be satisfied for every neighbor j of node i.

If nodes are mobile (as implied by the velocity vectors in FIG. 2), the interference constraints 1b and 2b must (ideally) be ensured for the entire duration of the radio resource allocation.

In an attempt to fulfil the interference constraints, many approaches, for instance, Young, C. D., "USAP Multiple Access: Dynamic Resource Allocation for Multiple Multi-channel Wireless Networking", Proc. of IEEE MILCOM 1999, 1:271-275, October 1999, require that no neighbor of node i be receiving and no neighbor of node j be transmitting in radio resource s. Such topology-based scheduling strategies have little overhead, but do not reflect the properties of wireless channels well. Moreover, these conventional approaches assume that all transmissions are omnidirectional, and are thus too conservative (i.e., spectrally inefficient), as they prevent significant radio resource reuse in networks where nodes may support beamforming.

Beamforming has the potential to dramatically increase radio resource reuse, and therefore network capacity, as a result of the much higher number of collision-free transmissions that may take place in parallel. If node i uses beamforming for transmission to node j, the energy radiated toward other neighbors l is minimal. Similarly, if node m uses beamforming for transmission to node n, the energy radiated toward node j is minimal. Thus, transmissions over all communication links (k,l), (i,j) and (m,n) may occur in the same radio resource without interference. A similar result is obtained when receive beamforming is used at node l and/or node j.

Supporting directional antennas in the design of radio resource scheduling algorithms has been addressed, for instance, in Bao L, Garcia-Luna-Aceves JJ, "Transmission Scheduling in Ad Hoc Networks with Directional Antennas", Proc. of the $8^{th}$ Annual International Conference on Mobile Computing and Networking (MobiCom), September 2002, which discloses a distributed receiver-oriented multiple access (ROMA) scheduling protocol for ad hoc networks with antennas capable of forming multiple beams. This approach incurs very little overhead. However, radio resource reuse is based on geometry (angular profiles), which does not take into account side lobes and may not work well in multipath channel environments, making it difficult to guarantee a given SINR target. Furthermore, this approach assumes that every node is equipped with a directional antenna. Thus, this approach cannot be applied to communication networks where some nodes use omnidirectional antennas.

Another approach was disclosed in U.S. Pat. Nos. 7,333,458 and 7,855,997 in the context of military communications. This approach, however, relies on the exchange of position information (e.g., GPS coordinates), which may not be available in certain situations, such as in a tunnel or urban canyon. Even when available, small inaccuracies in GPS location (±1 m) can lead to significant errors in the computation of direction if nodes are very close (within a few meters). Also, the approach disclosed in U.S. Pat. Nos. 7,333,458 and 7,855,997 is designed with a line-of-sight (LOS) channel in mind, which makes sense for aircraft-to-aircraft links. However, in future vehicular networks, for example, links may suffer from significant multipath fading, and a line of sight may not always exist between nearby nodes.

Grönkvist, J., "Interference-based Scheduling in Spatial Reuse TDMA", Doctoral Thesis, Royal Institute of Technology (KTH), Stockholm, Sweden, 2005, discloses an approach based on interference-based scheduling. This approach is limited to omnidirectional antennas and incurs considerable overhead, as interference measurements are exchanged among neighbors.

Thus, there is a need for an improved wireless communication device and method for communication in a wireless communication network, in particular a V2V communication network.

SUMMARY

It is an objective of the invention to provide an improved wireless communication device and method for communication in a wireless communication network, in particular a V2V communication network.

This objective is achieved by the features of the independent claims. Further implementation forms are apparent from the dependent claims, the description and the Figures.

According to a first aspect, the invention relates to a wireless communication device for communication in a wireless communication network supporting a plurality of radio resources, wherein the wireless communication device comprises: a transceiver being configured to measure a plurality of interference powers associated with a plurality of radio resources; and a processor being configured to determine, on the basis of the plurality of interference powers, conflicting radio resources of the wireless communication device; wherein the transceiver is further configured to transmit data identifying the conflicting radio resources of the wireless communication device to one or more wireless communication devices in the wireless communication network and to receive data identifying conflicting radio resources of the other wireless communication devices, and wherein the wireless communication device is configured to allocate at least one radio resource from the plurality of radio resources for communicating with the other wireless communication devices on the basis of the conflicting radio resources of the wireless communication device and the data identifying conflicting radio resources of the other wireless communication devices.

A conflicting radio resource in the sense of the present invention is a radio resource that, due to interference, is not suitable for communicating with another wireless communication device.

In a possible implementation form of the wireless communication device, the wireless communication device is configured to allocate at least one radio resource from the plurality of radio resources for communicating with the other wireless communication devices on the basis of the conflicting radio resources of the wireless communication device and the data identifying conflicting radio resources of the other wireless communication devices.

In yet another possible implementation form of the wireless communication device, the transceiver is configured to periodically broadcast a beacon message to the other wireless communication devices in the wireless communication network, wherein the beacon message comprises the data identifying the conflicting radio resources of the wireless communication device.

In yet another possible implementation form of the wireless communication device, the beacon message further comprises data identifying the radio resources already allocated for transmitting or receiving communication by the wireless communication device.

In yet another possible implementation form of the wireless communication device, the transceiver is implemented in the form of a smart antenna transceiver allowing for transmit beamforming and/or receive beamforming.

In yet another possible implementation form of the wireless communication device, the data identifying the conflicting radio resources of the wireless communication device comprise a transmitter conflicting resource set (TCRS) and/or a receiver conflicting resource set (RCRS).

In yet another possible implementation form of the wireless communication device, the processor at node 1 is configured to determine, on the basis of the plurality of interference powers, the transmitter conflicting resource set (TCRS) $C_{il}^T$ for each neighboring wireless communication device i by determining the radio resources s for which either $$\psi_{kl}^{(n)}(i, s) < 0$$

or $$\frac{\psi_{kl}^{(n)}(i, s) - \psi_{kl}^{(n-1)}(i, s)}{t_n - t_{n-1}} < -\frac{\psi_{kl}^{(n)}(i, s)}{\Delta},$$

wherein $$\psi_{kl}(i,s) = H_{kl}(s) - P_{il}^{(k,s)},$$

$$H_{kl}(s) = S_{kl}(s)/\gamma_{kl} - I_{kl}(s),$$

wherein $S_{kl}(s)$ denotes the received power from k's data transmission measured at node l in radio resource S, $\gamma_{kl}$ denotes the target SINR for link (k,l), $P_{il}^{(k,s)}$ denotes the received power from i's beacon transmission measured at node l under a specific antenna configuration used by node l to receive from node k in radio resource S, $I_{kl}(s)$ is associated with the interference power measured at node l for radio resource s radio resource, n refers to the most recent measurement, performed at time $t_n$, and $\Delta$ is a pre-defined parameter.

In yet another possible implementation form of the wireless communication device, the processor at node j is configured to determine, on the basis of the plurality of interference powers, the receiver conflicting resource set (RCRS) $C_{ij}^R$ for each neighboring wireless communication device i by determining the radio resources s for which either $$\phi_{ij}^{(n)}(s) < 0$$

or $$\frac{\phi_{ij}^{(n)}(s) - \phi_{ij}^{(n-1)}(s)}{t_n - t_{n-1}} < -\frac{\phi_{ij}^{(n)}(s)}{\Delta},$$

wherein $$\phi_{ij}(s) = P_{ij}^{(i,s)}/\gamma_{ij} - I_{ij}(s),$$

wherein $\gamma_{ij}$ denotes the target SINR for link (i,j), $P_{ij}^{(i,s)}$ denotes the received power from i's beacon transmission measured at node j under a specific antenna configuration used by node j to receive from node i in radio resource s, and $I_{ij}(s)$ is associated with the interference power measured for radio resource s.

In yet another possible implementation form of the wireless communication device, the wireless communication device is configured to allocate at least one radio resource from the plurality of radio resources for broadcast communication with other neighboring wireless communication devices using a two-way handshake process.

In yet another possible implementation form of the wireless communication device, the wireless communication device is configured to allocate at least one radio resource from the plurality of radio resources for unicast communication with a neighboring wireless communication device using a three-way handshake process.

In yet another possible implementation form of the wireless communication device, the plurality of radio resources are defined by a plurality of frequency channels and/or a plurality of time slots of a radio frame.

According to a second aspect, the invention relates to a method for communicating in a wireless communication network supporting a plurality of radio resources, the method comprising the steps of: measuring a plurality of interference powers associated with the plurality of radio resources of a wireless communication device; determining, on the basis of the plurality of interference powers, conflicting radio resources of the wireless communication device; transmitting data identifying the conflicting radio resources of the wireless communication device to at least one other wireless communication device in the wireless communication network and receiving data identifying conflicting radio resources of the at least one other wireless communication device; and allocating at least one radio resource from the plurality of radio resources for communicating with the at least one other wireless communication device on the basis of the conflicting radio resources of the wireless communication device and the data identifying conflicting radio resources of the at least one other wireless communication device.

The method according to the second aspect of the invention can be performed by the wireless communication device according to the first aspect of the invention. Further features of the method according to the second aspect of the invention result directly from the functionality of the wireless communication device according to the first aspect of the invention and its different implementation forms.

According to a third aspect, the invention relates to a computer program comprising program code for performing the method according to the second aspect of the invention when executed on a computer.

The invention can be implemented in hardware and/or software.

BRIEF DESCRIPTION OF THE DRAWINGS

Further embodiments of the invention will be described with respect to the following Figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the Figures. Further, it is understood that the features of the various exemplary aspects described herein may be combined with each other, unless specifically noted otherwise.

Figure 1:
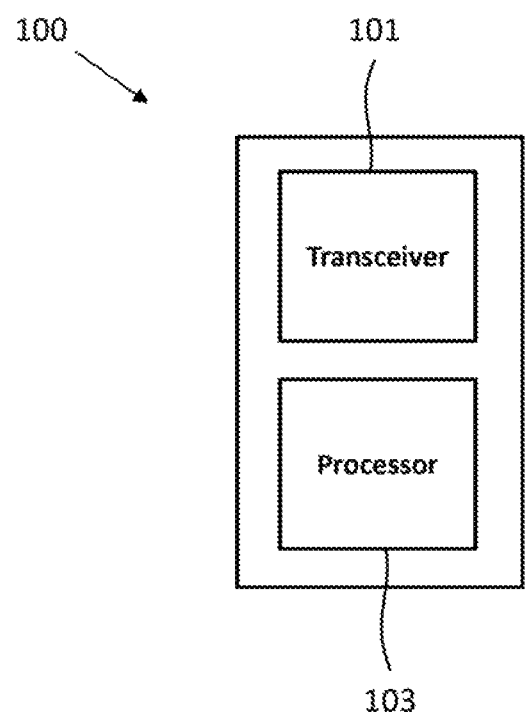
FIG. 1 shows a schematic diagram of a wireless communication device according to an embodiment.
Figure 2:
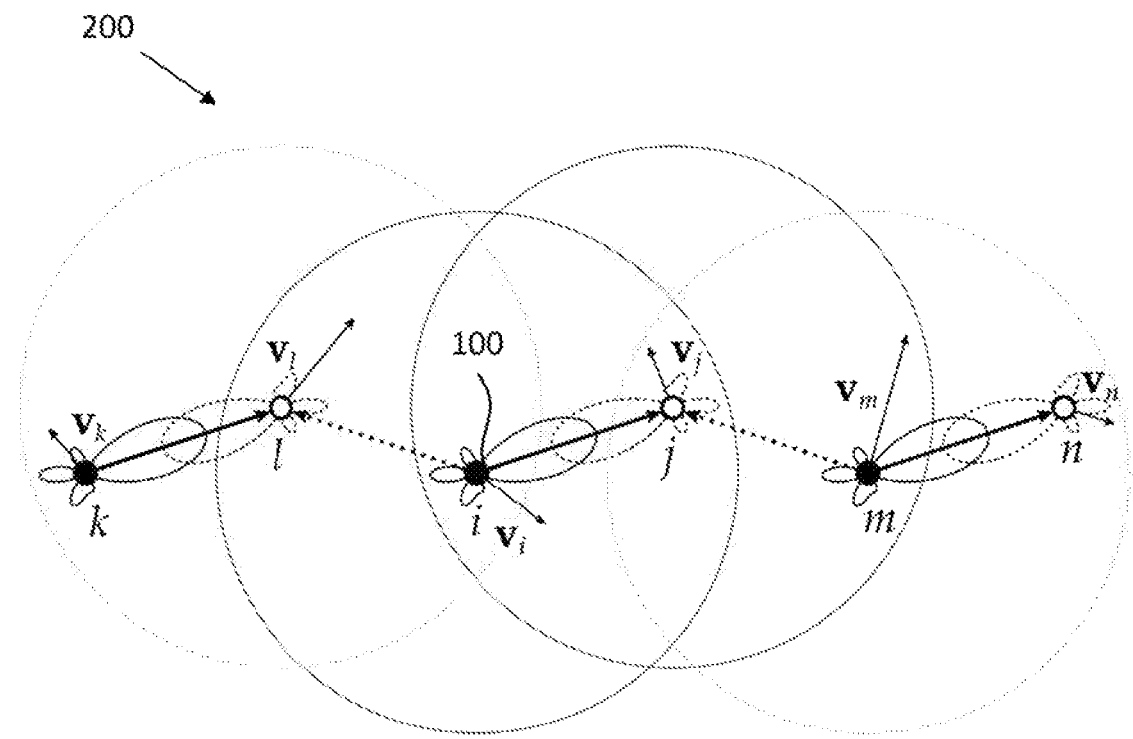
FIG. 2 shows a schematic diagram of a wireless communication network comprising a wireless communication device according to an embodiment.

FIG. 1 shows a schematic diagram of a wireless communication device 100 according to an embodiment. The wireless communication device 100 is configured to communicate in a wireless communication network 200 supporting a plurality of radio resources. An exemplary wireless communication network is shown in FIG. 2. The wireless communication device 100 can be operated as one of the nodes of the wireless communication network 200 shown in FIG. 2. Thus, in the following the expressions "wireless communication device" and "node" will be used interchangeably. In an embodiment, all nodes of the wireless communication network 200 can transmit on the same carrier frequency.

The wireless communication device 100 comprises a transceiver 101 being configured to measure a plurality of interference powers associated with the plurality of radio resources and a processor 103 being configured to determine, on the basis of the plurality of interference powers, conflicting radio resources of the wireless communication device 100. As will be described in further detail below, a conflicting radio resource in the sense of the present invention is a radio resource that is not suitable for communicating with another wireless communication device due to interference from at least one other wireless communication device.

The transceiver 101 is further configured to transmit data identifying the conflicting radio resources of the wireless communication device 100 to at least one other wireless communication device in the wireless communication network 200 and to receive data identifying conflicting radio resources of the at least one other wireless communication device.

The wireless communication device 100 is configured to allocate at least one radio resource from the plurality of radio resources for communicating with at least one other wireless communication device on the basis of the conflicting radio resources of the wireless communication device 100 and the data identifying conflicting radio resources of the at least one other wireless communication device.

Figure 3:
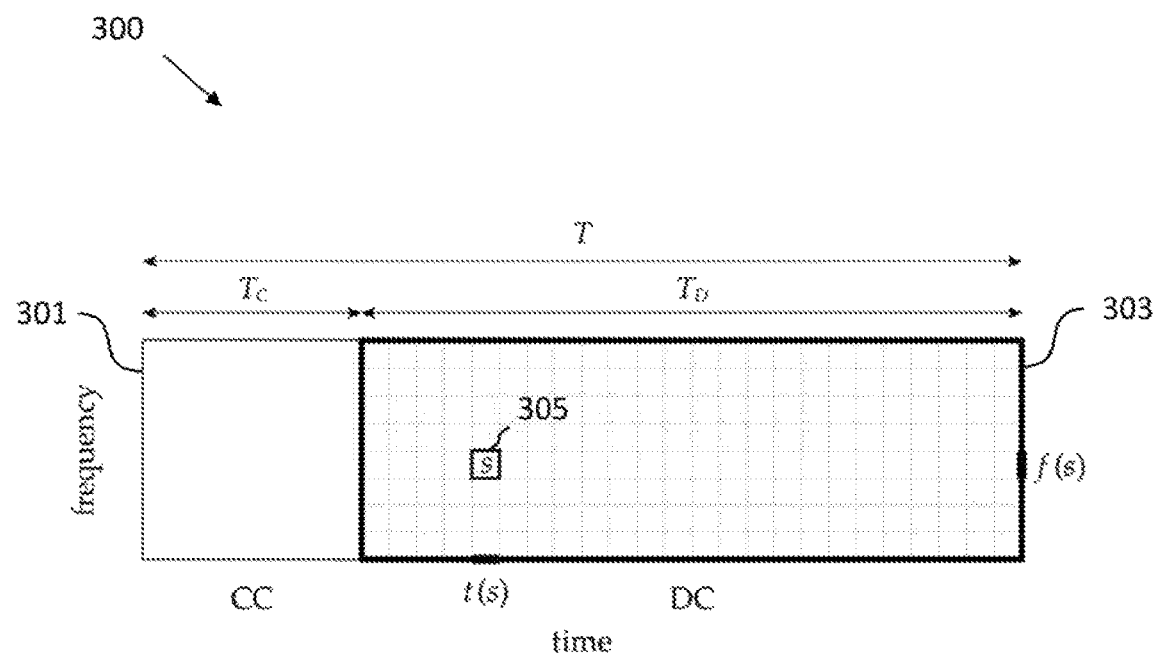
FIG. 3 shows a schematic diagram of a radio frame providing a plurality of radio resources for a wireless communication device according to an embodiment.

FIG. 3 shows an exemplary radio frame that can be used with a wireless communication device according to an embodiment, such as the wireless communication device 100 shown in FIGS. 1 and 2. The exemplary radio frame has a length of T ms and is composed of a Control Channel (CC) of length $T_C$ ms for exchange of control messages among nodes, and a Data Channel (DC) of length $T_D$ ms for data transmission. The DC of the exemplary radio frame is composed of a grid of $N_T \times N_F$ radio resources.

In an embodiment, a radio resource s is defined by a specific time slot, denoted by t(s), and a specific frequency channel, denoted by f(s). If s is a set of radio resources, t(s) denotes the corresponding set of time slots. $T_i$ denotes node i's transmit resource set $R_i$ denotes node i's receive resource set. Those skilled in the art will appreciate, however, that the present invention can be implemented using radio frames having a different structure as well. For instance, the present invention could be implemented within a wireless communication network using radio frames having only a single frequency channel, i.e., no frequency division.

In an embodiment, the wireless communication device 100 is configured to support and exploit beamforming when deciding whether a radio resource may be reused. However, beamforming is not required. Future networks will include nodes with advanced beamforming capabilities (e.g., vehicles) and others with very basic omnidirectional antennas. The goal is to support a mixture of antenna complexities, but exploit the radio resource reuse afforded by beamforming whenever possible to maximize network capacity.

In an embodiment, every node, i.e., wireless communication device, is equipped with at least one omnidirectional antenna. More advanced nodes may be equipped with one or even multiple adaptive arrays (e.g., in a vehicle).

Figure 4:
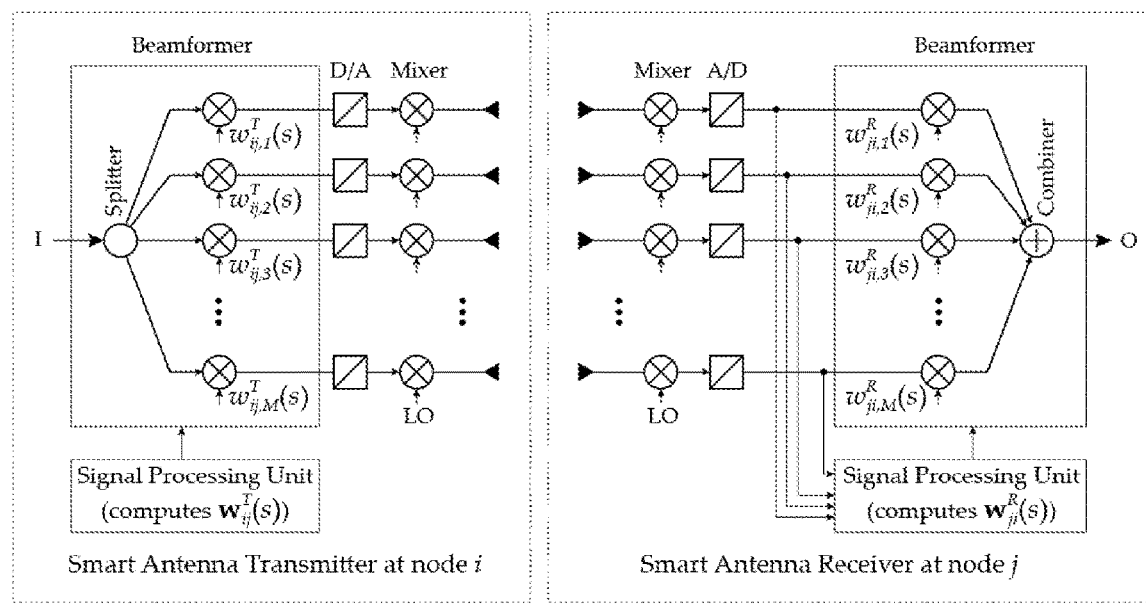
FIG. 4 shows a schematic diagram of a smart antenna transmitter and receiver that can be implemented in a wireless communication device according to an embodiment.

FIG. 4 shows the exemplary architecture of a transceiver 101 implemented in the form of a smart antenna, consisting of multiple radiating elements, each transmitting/receiving a phase-shifted and/or amplified version of the same signal stream. Those skilled in the art are well aware that by controlling the phase and amplitude of each radiating element, it is possible to control the directions in which the electromagnetic (EM) waves radiated/received at each element interfere constructively/destructively, effectively forming a transmit/receive beam. The phase and amplitude applied to each element is given by the corresponding entry in a complex weight vector w. A signal processing unit computes the Direction of Arrival (DoA) of an incoming wavefront by using a DoA algorithm (e.g., MUSIC, ESPRIT, etc.). This is then used to form either a receive or transmit beam toward the signal source.

In an embodiment, where the wireless communication device 100, i.e., node i, is configured to support beamforming, $w_{ij}^R(s)$ in FIG. 4 denotes the optimal array configuration (optimum complex weight vector) used by node i to receive from node j in radio resource s. In an embodiment, optimality may be based on maximizing SINR, given the set of nodes that are scheduled to transmit in radio resource s. In an embodiment, this requires adaptive beamforming, whereby the DoA(s) of not only the intended transmitter but also potential interferers are estimated. Doing so requires no assumption about the presence of a line of sight. $w_{ij}^T(s)$ in FIG. 4 denotes the optimal array configuration used by node i to transmit to node j in radio resource s. In an embodiment, optimality may be based on maximizing power in the DoA of node and minimizing power in the DoAs of nodes that are scheduled to receive in radio resource s. In an embodiment, this requires DoA estimation for each receiving node as in the case above.

In an embodiment, the wireless communication device 100, i.e., node i, is configured to be able to form multiple beams simultaneously. The number of simultaneous beams that can be formed by node i is denoted by $\mathcal{K}_i$. If node i does not support beamforming, $\mathcal{K}_i=0$. The number of beams currently used by node i in time slot t is denoted by $K_i(t)$. A binary vector $\alpha_i$ of length $N_T$ is defined as follows:

$$\alpha_i(t) = \begin{cases} 1 & \text{if } \kappa_i(t) < \mathcal{K}_i \\ 0 & \text{otherwise} \end{cases}$$

In an embodiment, radio resource allocation for unicast transmissions over a link (i,j) is based on a target SINR $\gamma_{ij}$, which is requested for every radio resource allocated to the link. For broadcast allocations to node i, $\gamma_{ij}=\gamma_i$ for all outgoing links (i,j). In an embodiment, every node j is configured to perform the following (physical layer) measurements in order to support interference awareness during radio resource allocation.

In an embodiment, the wireless communication device operating as node j is configured to compute an expected interference (plus noise) $I_{ij}(s)$ in the following way. For each radio resource s such that $t(s) \in t(T_j)$ and each data neighbor $i \in \mathcal{N}_j^D$ (defined below), the expected interference (plus noise) $I_{ij}(s)$ is computed by node j at the beginning of each frame n as $$I_{ij}(s) = \max_{k=1 \ldots v} I_{ij}^{(n-k)}(s),$$

where $I_{ij}^{(m)}(s)$ is the average interference power (plus noise) sensed in radio resource s, i.e., in an embodiment, the time slot t(s) and the frequency channel f(s), during frame m. In an embodiment, the maximum over the last v frames is used to avoid underestimating future interference in case some nodes did not transmit in their allocated radio resources during sensing. In an embodiment, if $\mathcal{K}_j>0$, sensing is performed (either sequentially or in parallel) under optimal array configuration $w_{ji}^R(s)$, $\forall i \in \mathcal{N}_j^D$.

In an embodiment, the node j, i.e., the wireless communication device 100, is configured to compute an interference headroom $H_{ij}(s)$ in the following way. For each radio resource $s \in R_j$ and each neighbor i from which node j is scheduled to receive in radio resource s, node computes the interference headroom $H_{ij}(s)$, defined as the maximum additional interference beyond which the target SINR $\gamma_{ij}$ would no longer be satisfied in radio resource s, given by $$H_{ij}(s)=S_{ij}(s)/\gamma_{ij}-I_{ij}(s)$$

where $S_{ij}(s)$ is the received power from i's data transmission measured at node j in radio resource s. In an embodiment, if $\mathcal{K}_j>0$, $S_{ij}(s)$ is measured under optimal array configuration $w_{ji}^R(s)$.

In an embodiment, the node j, i.e., the wireless communication device 100, is configured to compute a beacon received power $P_{ij}^{(k,s)}$ in the following way. For each control neighbor $i \in \mathcal{N}_j^C$ (defined below), $P_{ij}$ is the power received at node j from node i's beacon transmission. In an embodiment, if $\mathcal{K}_j>0$, $P_{ij}^{(k,s)}$ denotes the received power under optimal configuration $w_{jk}^R(s)$, which is measured (either sequentially or in parallel) during node i's beacon transmission in the CC for each node k scheduled to transmit to node j in radio resource s, and for k=i if i∈ $\mathcal{N}_j^P$.

In an embodiment, the wireless communication device 100 operating as node i is configured to broadcast a beacon message in the CC every $\tau_i$ (ms) using an omnidirectional antenna configuration, i.e., no beamforming, with transmit power $P_i$ (mW). In an embodiment, the beacon period $\tau_i$ and transmit power $P_i$ can be dynamically adapted to local node mobility and/or density.

Figure 5:
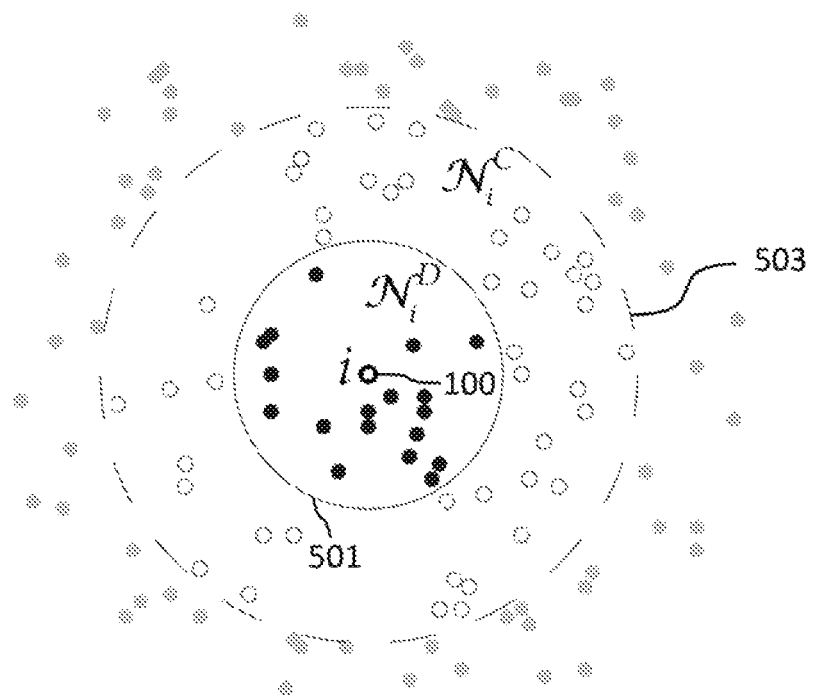
FIG. 5 shows a schematic diagram of a data and a control neighborhood of a wireless communication device according to an embodiment.

Let $\gamma_C$ and $\gamma_D$ denote thresholds for reliable reception of control and data, respectively. The set $\mathcal{N}_i^P$ of node i's data neighbors is formed by every node j satisfying $P_{ij} > \gamma_D$ and $P_{ji} > \gamma_D$. The set $\mathcal{N}_i^C$ of i's control neighbors is formed by every node l satisfying $P_{il} > \gamma_C$ and $P_{li} > \gamma_C$. In an embodiment, it is assumed that $\gamma_C < \gamma_D$, and thus, $\mathcal{N}_i^P \subseteq \mathcal{N}_i^C$. In an embodiment, this can be achieved by using a lower modulation order and/or code rate when transmitting in the CC compared to the DC (e.g., QPSK for control and 64-QAM for data transmission). FIG. 5 shows an example of the data neighborhood 501, i.e., $\mathcal{N}_i^P$, and the control neighborhood 503, i.e., $\mathcal{N}_i^C$, of the wireless communication device 100, i.e., node i, assuming free space propagation, uniform beacon transmit power and $\gamma_C = \gamma_D/4$.

In an embodiment, the wireless communication device 100 is configured to compute data defining a set of conflicting radio resources. In an embodiment, the wireless communication device 100 is configured to determine conflicting radio resources, by computing conflicting resources sets (CRS), in particular a transmitter conflicting resource set (TCRS) and a receiver conflicting resource set (RCRS).

In an embodiment, the wireless communication device 100 at node l is configured to compute the transmitter conflicting resource set (TCRS) $C_{il}^T$ in the following way. Let s∈$R_l$ be a radio resource in which node l is scheduled to receive from node k and define a margin $$\psi_{kl}(i,s) = H_{kl}(s) - P_{il}^{(k,s)}.$$

In an embodiment, the transmitter conflicting resource set (TCRS) $C_{il}^T$, computed at node l is formed by all radio resources s∈$R_l$ for which either $$\psi_{kl}^{(n)}(i,s) < 0$$

or $$\frac{\psi_{kl}^{(n)}(i,s) - \psi_{kl}^{(n-1)}(i,s)}{t_n - t_{n-1}} < -\frac{\psi_{kl}^{(n)}(i,s)}{\Delta},$$

where n refers to the most recent measurement, performed at time $t_n$, and $\Delta$ is a parameter controlling for how long the interference constraints must be satisfied (assuming $\psi_{kl}(i,s)$ changes linearly with time). In this embodiment, those radio resources are considered to be conflicting for which the margin $\psi_{kl}(i,s)$ is expected to fall below zero shortly (how shortly depending on $\Delta$), and thus serves to prevent excessive signalling overhead due to frequent rescheduling.

In an embodiment, the wireless communication device 100 at node j is configured to compute the receiver conflicting resource set (RCRS) $C_{ij}^R$ in the following way. Let s be a radio resource such that $t(s) \in t(T_j)$, i.e., node j is not scheduled to transmit in time slot t(s) and define $$\phi_{ij}(s) = P_{ij}^{(i,s)}/\gamma_{ij} - I_{ij}(s).$$

In an embodiment, the receiver conflicting resource set (RCRS) $C_{ij}^R$, computed at j, is formed by all radio resources s for which either $$\phi_{ij}^{(n)}(s) < 0$$

or $$\frac{\phi_{ij}^{(n)}(s) - \phi_{ij}^{(n-1)}(s)}{t_n - t_{n-1}} < -\frac{\phi_{ij}^{(n)}(s)}{\Delta}.$$

As already described below in the context of FIG. 5, in an embodiment, the wireless communication device 100 is configured to periodically broadcast a beacon message. In an embodiment, the beacon message periodically broadcast by the wireless communication device 100 operating, for instance, as node i, contains at least one of the following data elements:

1. $T_i$, i.e., the transmit resource set of node i,
2. $R_i$, i.e., the receive resource set of node i,
3. $C_{li}^T$, $\forall l \in \mathcal{N}_i^C$, i.e., the transmitter conflicting resource set (TCRS) at node i for each control neighbor l,
4. $C_{ji}^R$, $\forall j \in \mathcal{N}_i^P$), i.e., the receiver conflicting resource set (RCRS) at node i for each data neighbor j,
5. $\alpha_i$, (only if $\mathcal{K}_i > 0$), and/or
6. $\gamma_i$.

In an embodiment, the sets $T_i$ and $R_i$ can be efficiently encoded by using a binary vector of length $N_T \times N_F$, with entries corresponding to radio resources where node i is scheduled to transmit (receive) set to one, and all others set to zero. A similar binary vector may be used to encode $C_{li}^T$ and $C_{ji}^R$, although these vectors need only be of length $L_T = |R_i|$ and $L_R = (N_T - |t(T_i)|) \times N_F$, respectively. Assuming $\gamma_i$ is encoded with 8 bits, the size in bits of a beacon message is then given by $$S = 2N_T N_F + L_T |\mathcal{N}_i^C| + L_R |\mathcal{N}_i^P| + N_T + 8.$$

For example, if $N_T = 10$, $N_F = 8$, $|R_i| = 10$, $|t(T_i)| = 5$, $\mathcal{N}_i^P = 10$ and $\mathcal{N}_i^C = 40$, the size of the beacon message is S=978 bits. If $\tau_i = 1s$, the resulting overhead at node i is approx. 1 kbit/s.

Figure 6:
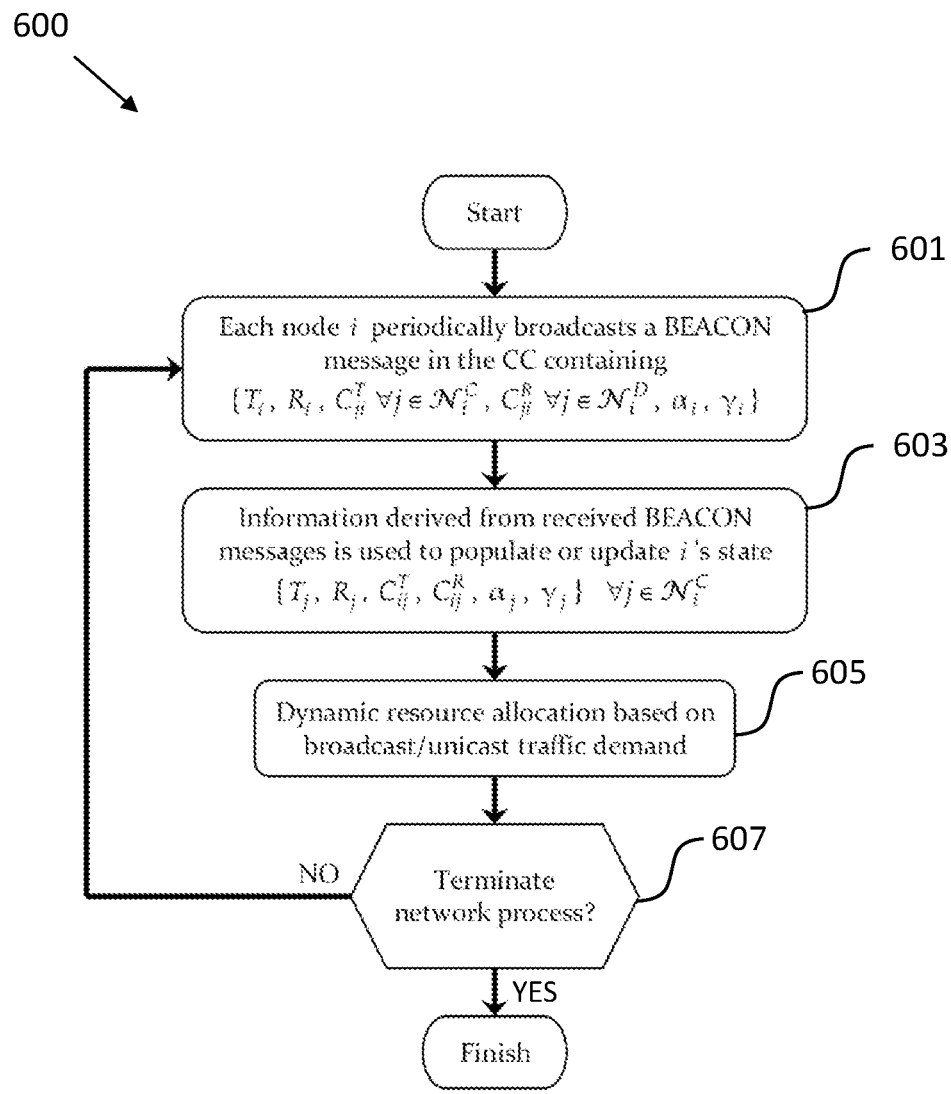
FIG. 6 shows a schematic diagram of different aspects of a wireless communication device according to an embodiment.

FIG. 6 shows a diagram illustrating different operating stages of the wireless communication device 100, some of which already have been described above.

As already described above, in an embodiment, the wireless communication device 100 operating as node i is configured to periodically transmit in a stage 601 of FIG. 6 a beacon message containing the above described data elements.

Having received beacon messages from other nodes j, the wireless communication device 100 operating as node i is configured to update its state in stage 603 of FIG. 6, in particular its transmitter conflicting resource set (TCRS) for each control neighbor and its receiver conflicting resource set (RCRS) for each data neighbor.

On the basis of its updated state and based on traffic demand, the wireless communication device 100 operating as node i is configured to trigger a dynamic resource allocation (DRA) process for broadcast and unicast transmissions in stage 605 of FIG. 6, which will be described in more detail further below.

The loop consisting of stages 601, 603, 605 and 607 of FIG. 6 is performed as long as the wireless communication device 100 wants to communicate within the wireless communication network 200.

Figure 7:
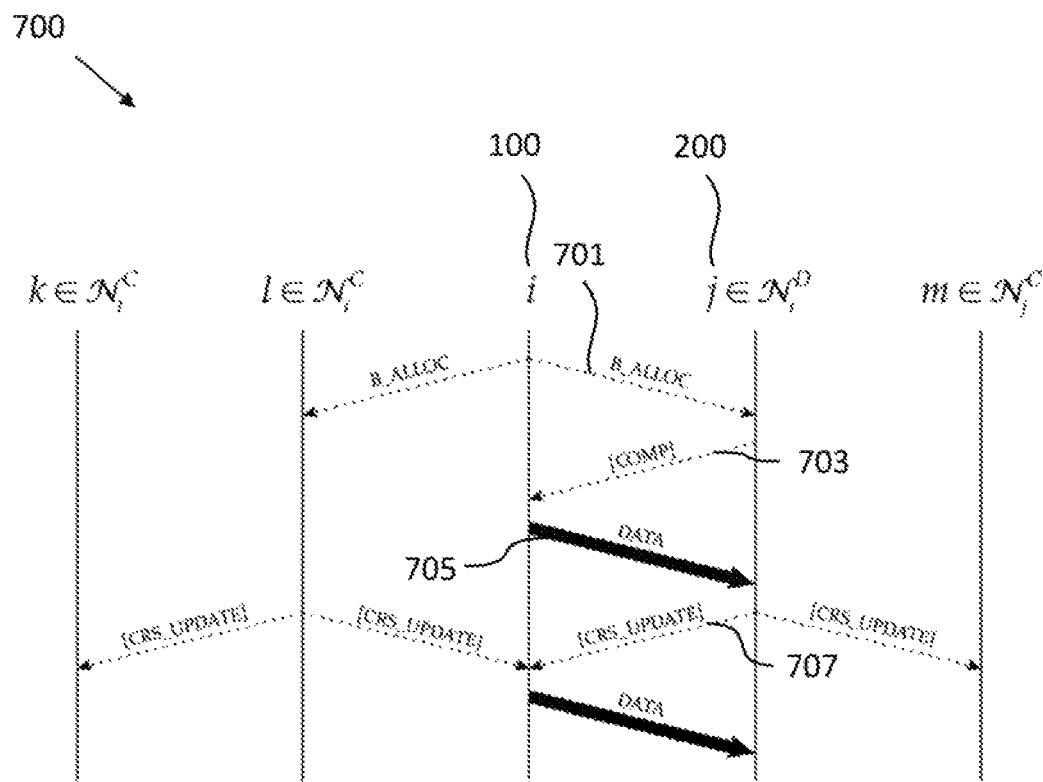
FIG. 7 shows a schematic diagram of a broadcast radio resource allocation process implemented in a wireless communication device according to an embodiment.

For broadcast transmissions, in an embodiment, the wireless communication device 100 operating as node i is configured to perform the radio resource allocation process 700 shown in FIG. 7 in the form of a two-way handshake procedure.

In an embodiment, the wireless communication device 100 operating as node i sends in a first step 701 a broadcast allocation (B_ALLOC) message over the CC. In an embodiment, the broadcast allocation message contains at least one of the following elements:

1. the set $\Delta T_i$ of selected radio resources s satisfying
   a. i's constraints, i.e.,
      i. $t(s) \in t(R_i)$
      ii. $s \in T_i$
      iii. $\forall l \in \mathcal{N}_i^C$, $s \in C_{il}^T$
   b. j's constraints $\forall j \in \mathcal{N}_i^D$, i.e.,
      i. $t(s) \in t(T_j)$
      ii. if $\mathcal{K}_j = 0$, $s \in R_j$, else $\alpha_j(t(s)) = 1$
      iii. $s \in C_{ij}^R$
2. the lifetime (expiration time) of the allocation.

In an embodiment, the wireless communication device 100 operating as node i is configured to select the set $\Delta T_i$ of selected radio resources s on the basis of the transmit resource set $T_i$ of node i by using a suitable selection algorithm from a plurality of different possible selection algorithms.

Every data neighbor $j \in \mathcal{N}_i^D$, upon receiving the B_ALLOC message, checks whether there is a conflict with its existing allocations. This may happen if the information on which node i based its radio resource selection was out of date (e.g., if multiple nodes request the same radio resources within a short period of time). If a conflict is detected, node j sends in step 703 of FIG. 7 a complaint (COMP) message back to node i indicating the conflicting resources. If no complaint messages are received within a certain time (e.g., one radio frame), in an embodiment, node i assumes there is no conflict and may start broadcasting DATA in the selected radio resources, as indicated by step 705 of FIG. 7. If, on the other hand, one or more complaint messages indicating the conflicting resources are received, node i, in an embodiment, discards the conflicting resources and may start broadcasting DATA on the remaining resources.

In an embodiment, information about the discarded radio resources is piggybacked on the first DATA broadcast in step 705 of FIG. 7, so that all data neighbors of node i are aware of the actual allocation of radio resources.

In an embodiment, every control neighbor $l \in \mathcal{N}_i^C$, upon receiving/sensing the first DATA message in step 705 of FIG. 7, checks whether its conflicting resource sets have changed. If so, the corresponding control neighbor broadcasts in step 707 of FIG. 7 a CRS_UPDATE message containing the new conflicting resources.

Figure 8:
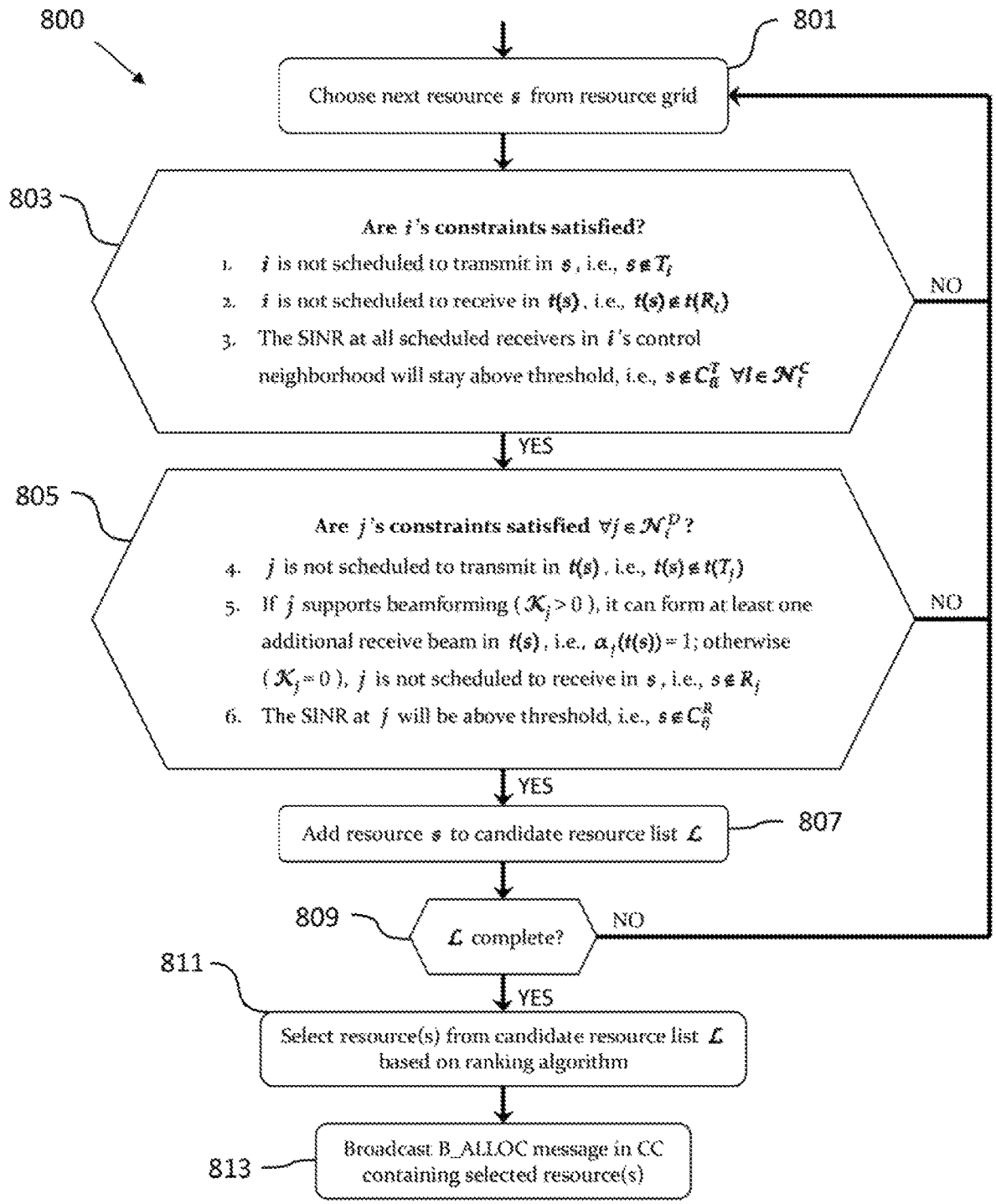
FIG. 8 shows a schematic diagram of different aspects of a wireless communication device according to an embodiment.

FIG. 8 shows in more detail the steps performed in the wireless communication device 100 according to an embodiment for deriving the set $\Delta T_i$ of selected radio resources s contained in the broadcast allocation (B_ALLOC) message of step 701 of FIG. 7.

In step 801 the wireless communication device 100 chooses a new radio resource s from the pool of available resources.

In step 803 the wireless communication device 100 checks whether the new radio resource s satisfies the constraints of node i, which already have been described above, namely (1) node i is not scheduled to transmit in radio resource s, i.e., $s \in T_i$, (2) node i is not scheduled to receive in $t(s)$, i.e., $t(s) \in t(R_i)$, and (3) the SINR at all scheduled receivers in node i's control neighborhood will stay above threshold, i.e., $s \in C_{il}^T$ $\forall l \in \mathcal{N}_i^C$. In case the new radio resource s does not satisfy these constraints of node i, the wireless communication device 100 operating as node i will discard the new radio resource s and will select the next radio resource from the pool of available resources.

In step 805 the wireless communication device 100 checks whether the new radio resource s satisfies the constraints of the every node j within the data neighborhood of node i, which already have been described above, namely (4) node j is not scheduled to transmit in $t(s)$, i.e., $t(s) \in t(T_j)$, (5) if node j supports beamforming ($\mathcal{K}_j > 0$), it can form at least one additional receive beam in $t(s)$, i.e., $\alpha_j(t(s)) = 1$; otherwise (i.e., $\mathcal{K}_j = 0$), node j is not scheduled to receive in radio resource s, i.e., $s \in R_j$, and (6) the SINR at node j will be above threshold, i.e., $s \in C_{ij}^R$. In case the new radio resource s does not satisfy these constraints for every j within the data neighborhood of node i, the wireless communication device 100 operating as node i will discard the new radio resource s and will select the next radio resource from the pool of available resources.

Having met the constraints in steps 803 and 805 of FIG. 8, the new radio resource s is added in step 807 of FIG. 8 to the list $\mathcal{L}$ of candidate resources.

The loop consisting of steps 801, 803, 805 and 807 is processed as long as the list $\mathcal{L}$ of candidate resources is not complete (see step 809 of FIG. 8).

In step 811 of FIG. 8 the wireless communication device 100 selects one or more radio resources s from the list $\mathcal{L}$ of candidate resources on the basis of a selection or ranking algorithm and broadcasts these selected radio resources in step 813 of FIG. 8 (corresponding to step 701 of FIG. 7).

In an embodiment, the wireless communication device 100 operating as node i is configured to select one or more radio resources s from the list $\mathcal{L}$ of candidate resources by using a suitable selection algorithm from a plurality of different possible selection algorithms.

Figure 9:
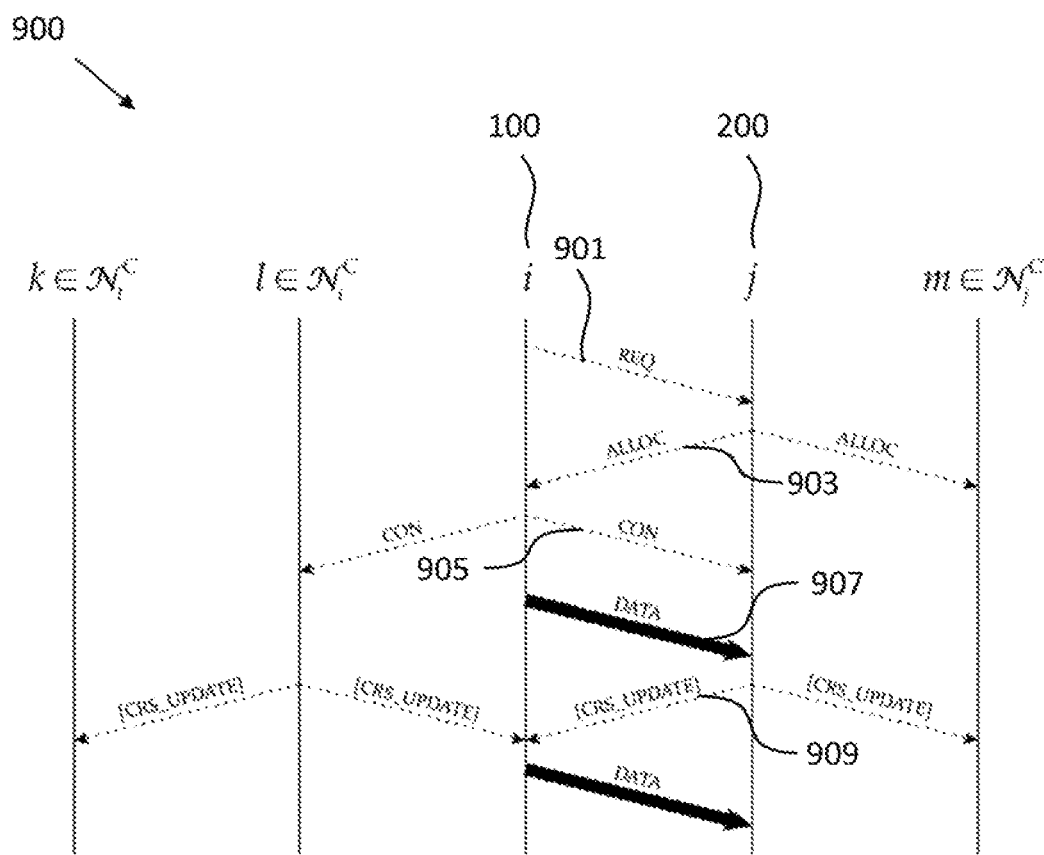
FIG. 9 shows a schematic diagram of a unicast radio resource allocation process implemented in a wireless communication device according to an embodiment.

For unicast communication over a link (i,j), in an embodiment, the wireless communication device 100 is configured to perform the radio resource allocation process 900 shown in FIG. 9 in the form of a three-way handshake procedure.

In a first step 901 the wireless communication device 100 operating as node i sends a request (REQ) message to node j. In an embodiment, the request message sent from node i to node j contains at least one of the following data elements:

1. a prioritized list $\mathcal{L}$ of radio resources s satisfying
   a. i's constraints, i.e.,
      i. $t(s) \in t(R_i)$
      ii. If $\mathcal{K}_i = 0$, $s \in T_i$, else $\alpha_i(t(s)) = 1$
      iii. $\forall l - \mathcal{N}_i^C$, $s \in C_{il}^T$
   b. j's constraints, i.e.,
      i. $t(s) \in t(T_j)$
      ii. if $\mathcal{K}_j = 0$, $s \in R_j$, else $\alpha_j(t(s)) = 1$
      iii. $s \in C_{ij}^R$
2. the target SINR $\gamma_{ij}$ requested for link (i,j)
3. the number of resources requested
4. the desired lifetime (expiration time) of the allocation
5. the priority associated with this request.

In an embodiment, where the wireless communication device 100 is configured to support beamforming, i.e., $\mathcal{K}_i > 0$, and is configured to form nulls (or very small side lobes) in the DoA(s) of node l's beacons (for every l such that $s \in C_{il}^T$) when transmitting to node j with optimal array configuration $w_{ij}^T(s)$, the above constraint 1b can be skipped.

In an embodiment, the wireless communication device 100 operating as node i is configured to prioritize the list $\mathcal{L}$ of radio resources s on the basis of a prioritization algorithm from a plurality of different possible prioritization algorithms.

In response, the allocation (ALLOC) message broadcast by node j in step 903 of FIG. 9 contains at least one of the following data elements:

1. the set $\Delta R_j$ of radio resources s allocated to link (i,j), selected out of those in $\mathcal{L}$. Prior to selection, j discards any radio resources in $\mathcal{L}$ which no longer satisfy j's constraints. This may happen if i was not up to date regarding j's state.
2. the lifetime (expiration time) of the allocation.

In response, the confirmation (CON) message broadcast by node i can contain at least one of the following data elements:

1. the set $\Delta T_i$ ($\equiv \Delta R_j$) of radio resources allocated to link (i,j)
2. the lifetime (expiration time) of the allocation.

In an embodiment, if a node receives multiple request messages from different neighbors within a short period of time, it is configured to perform the allocations sequentially based on their priority. In an embodiment, it waits for the confirmation message corresponding to the request message being processed, and updates its radio resource schedule accordingly, before handling the next request message. It may be advantageous to avoid selecting radio resources recently allocated in the neighborhood, as their conflict status may not be up to date.

After sending the confirmation message in step 905 of FIG. 9, node i may start transmitting in step 907 of FIG. 9 data (DATA) messages to node j in the allocated radio resources, i.e., the set $\Delta T_i$. In an embodiment where node i is configured to support beamforming, node i can be configured to adjust its transmit power so that the equivalent isotropically radiated power (EIRP) in the direction of maximum gain is equal to the EIRP of its beacon transmissions, since the set $C_{il}^T$ is calculated based on the received beacon power.

In an embodiment, every control neighbor $l \in \mathcal{N}_i^C$ of node i, upon receiving/sensing the first data message in step 907 of FIG. 9, checks whether its CRSs have changed. If so, the corresponding control neighbor broadcasts in step 909 of FIG. 9 a CRS_UPDATE message containing the new conflicting resources.

As those skilled in the art will appreciate, node movement can alter the network geometry, so that the interference constraints may no longer be satisfied before an allocation expires. To deal with this, in an embodiment, every node j may continuously monitor the SINR for every radio resource s allocated to an incoming link (i,j) and adapt the modulation and coding scheme (MCS) used for the link in that radio resource to increase robustness in the face of unexpected interference. If the SINR falls below a certain threshold, the corresponding node may drop the allocation, notifying its control neighbors with a DEALLOC message that contains the dropped resources.

Figure 10:
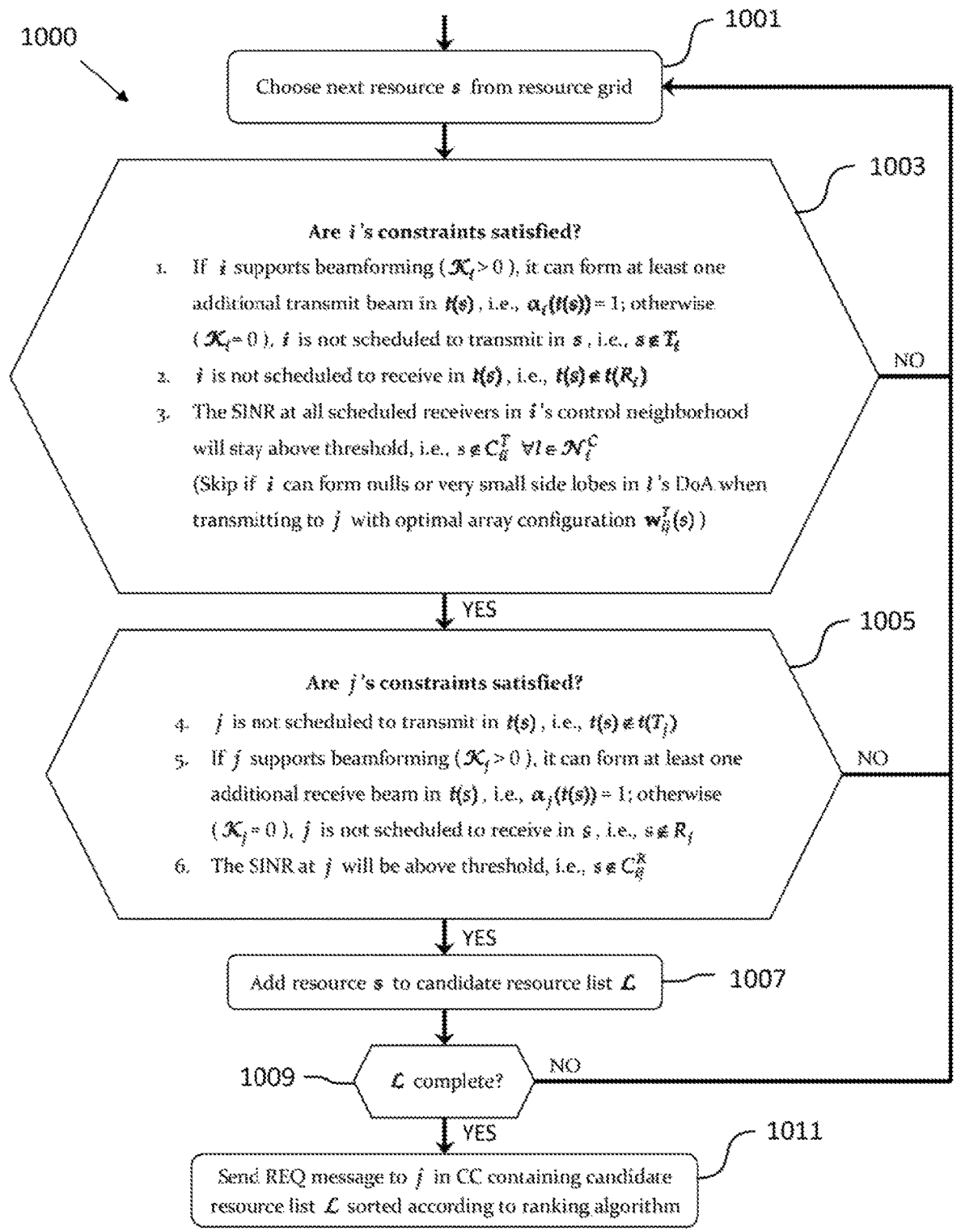
FIG. 10 shows a schematic diagram of different aspects of a wireless communication device according to an embodiment.

FIG. 10 shows in more detail the steps performed in the wireless communication device 100 according to an embodiment for deriving the prioritized list $\mathcal{L}$ of radio resources s contained in the request (REQ) message of step 901 of FIG. 9.

In step 1001 the wireless communication device 100 chooses a new radio resource s from the pool of available resources.

In step 1003 the wireless communication device 100 operating as node i checks whether the new radio resource s satisfies the constraints of node i, which already have been described above, namely (1) if node i supports beamforming ($\mathcal{K}_i > 0$), it can form at least one additional transmit beam in $t(s)$, i.e., $\alpha_i(t(s))=1$; otherwise ($\mathcal{K}_i = 0$), node i is not scheduled to transmit in s, i.e., $s \in T_i$, (2) node i is not scheduled to receive in $t(s)$, i.e., $t(s) \in t(R_i)$, and (3) the SINR at all scheduled receivers in node i's control neighborhood will stay above threshold, i.e., $s \in C_{il}^T \; \forall l \in \mathcal{N}_i^C$ (as already described above, this constraint can be skipped, if node i can form nulls or very small side lobes in node l's DoA when transmitting to node j with optimal array configuration $w_{ij}^T(s)$). In case the new radio resource s does not satisfy these constraints of node i, the wireless communication device 100 will discard the new radio resource s and will select the next radio resource from the pool of available resources.

In step 1005 the wireless communication device 100 checks whether the new radio resource s satisfies the constraints of the receiving node j, which already have been described above, namely (4) node is not scheduled to transmit in $t(s)$, i.e., $t(s) \in t(T_j)$, (5) if node j supports beamforming ($\mathcal{K}_j > 0$), it can form at least one additional receive beam in $t(s)$, i.e., $\alpha_j(t(s))=1$; otherwise ($\mathcal{K}_j = 0$), node j is not scheduled to receive in s, i.e., $s \in R_j$, and (6) the SINR at node j will be above threshold, i.e., $s \in C_{ij}^R$. In case the new radio resource s does not satisfy these constraints of node j, the wireless communication device 100 will discard the new radio resource s and will select the next radio resource from the pool of available resources.

Having met the constraints in steps 1003 and 1005 of FIG. 10, the new radio resource s is added in step 1007 of FIG. 10 to the list $\mathcal{L}$ of candidate resources.

The loop consisting of steps 1001, 1003, 1005 and 1007 is processed as long as the list $\mathcal{L}$ of candidate resources is not complete (see step 1009 of FIG. 10).

In step 1011 of FIG. 10 the wireless communication device 100 sends the list $\mathcal{L}$ of candidate resources as part of the request (REQ) message to node j (corresponding to step 901 of FIG. 9). The candidate radio resources in the list $\mathcal{L}$ may be ranked using an arbitrary ranking algorithm.

Figure 11:
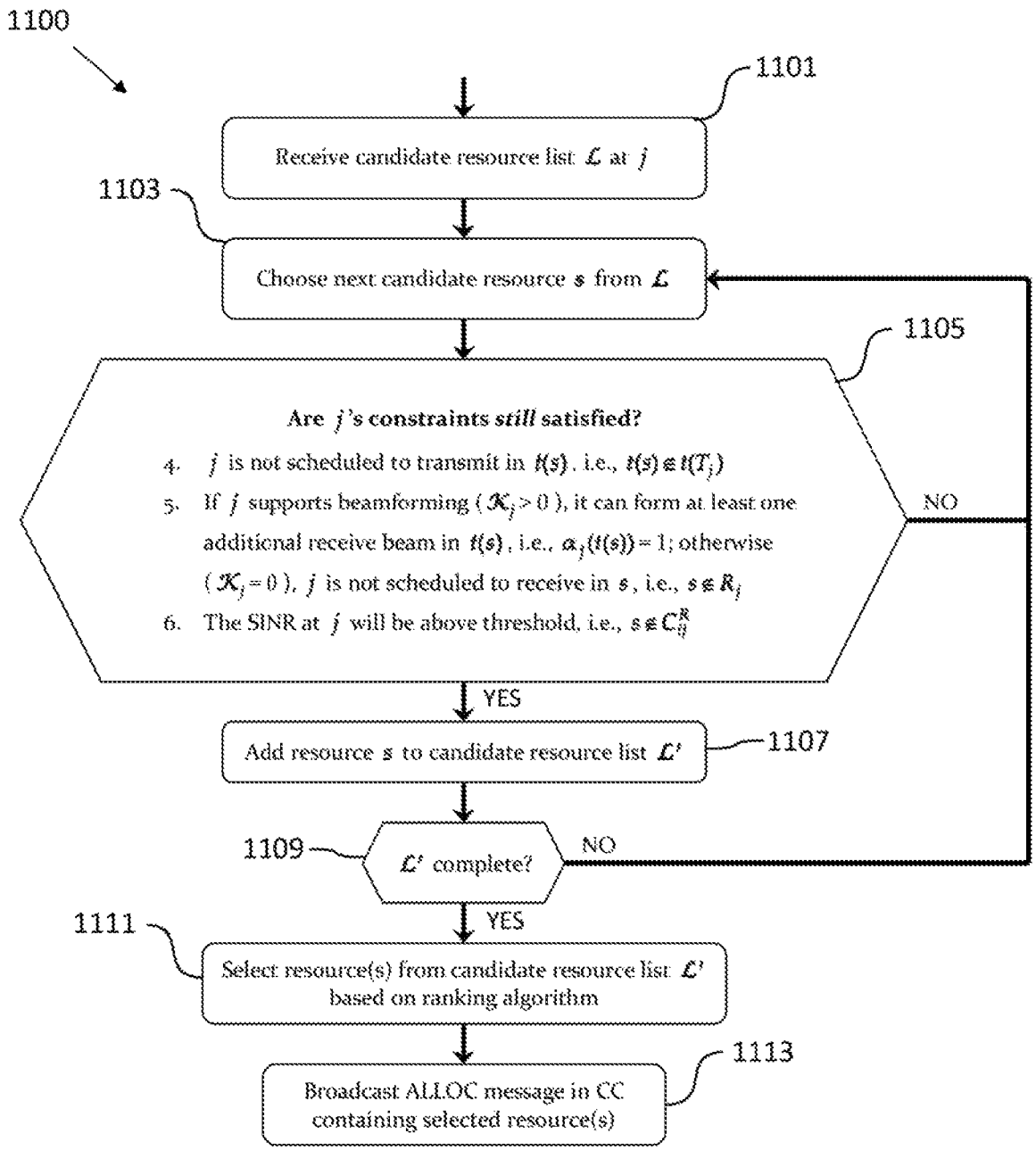
FIG. 11 shows a schematic diagram of different aspects of a wireless communication device according to an embodiment.

FIG. 11 shows in more detail the steps performed in the wireless communication device 100, when operating as receiving node j, according to an embodiment for deriving the set $\Delta R_j$ of radio resources s contained in the allocation (ALLOC) message of step 903 of FIG. 9.

Having received the candidate resource list $\mathcal{L}$ from node l in step 1101 of FIG. 11, the wireless communication device 100 operating as receiving node j chooses in step 1103 of FIG. 11 a new radio resource s from the list $\mathcal{L}$.

In step 1105 of FIG. 11 the wireless communication device 100 operating as node j checks whether the new radio resource s still satisfies its constraints, which already have been described above, namely (4) node j is not scheduled to transmit in $t(s)$, i.e., $t(s) \in t(T_j)$, (5) if node j supports beamforming ($\mathcal{K}_j > 0$), it can form at least one additional receive beam in $t(s)$, i.e., $\alpha_j(t(s))=1$; otherwise ($\mathcal{K}_j = 0$), node j is not scheduled to receive in s, i.e., $s \in R_j$, and (6) the SINR at node j will be above threshold, i.e., $s \in C_{ij}^R$. In case the new radio resource s no longer satisfies these constraints of node j, the wireless communication device 100 will discard the new radio resource s and will select the next radio resource from the candidate resource list $\mathcal{L}$.

Having met the constraints in step 1105 of FIG. 11, the new radio resource s is added in step 1107 of FIG. 11 to the modified list $\mathcal{L}'$ of candidate resources.

The loop consisting of steps 1103, 1105 and 1107 is processed as long as the modified list $\mathcal{L}'$ of candidate resources is not complete (see step 1109 of FIG. 11).

In step 1111 of FIG. 11 the wireless communication device 100 operating as node j selects one or more radio resources s from the modified list $\mathcal{L}'$ of candidate resources on the basis of a selection or ranking algorithm and broadcasts these selected resources in the form of an allocation (ALLOC) message in step 1113 of FIG. 11 (corresponding to step 903 of FIG. 9).

In an embodiment, the wireless communication device 100 operating as node j is configured to select one or more radio resources s from the modified list $\mathcal{L}'$ of candidate resources by using a suitable selection or ranking algorithm from a plurality of different possible selection/ranking algorithms.

As those skilled in the art will appreciate, embodiments of the invention use two sets of conflicting radio resources, which are computed locally based on periodic physical (PHY) layer measurements. Embodiments of the invention take into account an optimal smart antenna configuration when sensing the channel and when measuring the interference power received from neighbor beacons. Embodiments of the invention encode in binary form whether a radio resource is conflicting. In embodiments of the invention, the conflict status is computed locally based on said measurements. Thus, in embodiments of the invention, neither measured values nor antenna properties are exchanged among neighbors, as this would incur significant overhead. Moreover, embodiments of the invention support multiple beams simultaneously, multiple frequency channels, and interleaved broadcast and unicast allocations within the same radio resource grid.

Embodiments of the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The invention claimed is:

1. A first wireless communication device for communication in a wireless communication network supporting a plurality of radio resources, wherein the wireless communication device comprises:
a transceiver configured to measure physical layer characteristics associated with the first wireless communication device to determine a plurality of interference powers associated with the plurality of radio resources;
a processor configured to determine, based at least in part on the plurality of interference powers, conflicting radio resources of the first wireless communication device, the conflicting radio resources being radio resources that are not suitable for communicating with a second wireless communication device;
wherein the transceiver is further configured to:
transmit data identifying the conflicting radio resources of the first wireless communication device to the second wireless communication device;
receive data identifying conflicting radio resources of the second wireless communication device, and
wherein the processor is configured to allocate at least one radio resource from the plurality of radio resources for communicating with the second wireless communication device based on the determined conflicting radio resources of the first wireless communication device and the received data identifying conflicting radio resources of the second wireless communication device.

2. The first wireless communication device of claim 1, wherein the wireless communication device is configured to allocate at least one radio resource from the plurality of radio resources for communicating with second wireless communication device based at least in part on the conflicting radio resources of the first wireless communication device and the data identifying conflicting radio resources of the second wireless communication device.

3. The first wireless communication device of claim 1, wherein the transceiver is configured to periodically broadcast a beacon message to the second wireless communication device in the wireless communication network, wherein the beacon message comprises the data identifying the conflicting radio resources of the first wireless communication device.

4. The first wireless communication device of claim 3, wherein the beacon message further comprises data identifying the radio resources from the plurality of radio resources already allocated for transmitting or receiving communication by the first wireless communication device.

5. The first wireless communication device of claim 1, further comprising a smart antenna transceiver for transmitting and receiving beamforming.

6. The first wireless communication device of claim 1, wherein the data identifying the conflicting radio resources of the first wireless communication device comprises a transmitter conflicting resource set (TCRS) or a receiver conflicting resource set (RCRS).

7. The first wireless communication device of claim 6, wherein a processor at node l is configured to determine, on the basis of the plurality of interference powers, the transmitter conflicting resource set (TCRS) $C_{il}^T$ for each neighboring wireless communication device i by determining the radio resources s for which either $$\psi_{kl}^{(n)}(i,s) < 0$$

or $$\frac{\psi_{kl}^{(n)}(i,s) - \psi_{kl}^{(n-1)}(i,s)}{t_n - t_{n-1}} < -\frac{\psi_{kl}^{(n)}(i,s)}{\Delta},$$

wherein
$\psi_{kl}(i,s) = H_{kl}(s) - P_{il}^{(k,s)}$,
$H_{kl}(s) = S_{kl}(s)/\gamma_{kl} - I_{kl}(s)$,
wherein $S_{kl}(s)$ denotes the received power from k's data transmission measured at node l in radio resource S, $\gamma_{kl}$ denotes the target SINK for link (k,l), $P_{il}^{(k,s)}$ denotes the received power from i's beacon transmission measured at node l under a specific antenna configuration used by node l to receive from node k in radio resource s, $I_{kl}(s)$ is associated with the interference power measured at node l for radio resource s,n refers to the most recent measurement, performed at time $t_n$, and $\Delta$ is a predefined parameter, wherein the processor at node j is part of the first wireless communication device.

8. The first wireless communication device of claim 6, wherein a processor at node j is configured to determine, on the basis of the plurality of interference powers, the receiver conflicting resource set (RCRS) $C_{ij}^R$ for each neighboring wireless communication device i by determining the radio resources s for which either $$\varphi_{ij}^{(n)}(s) < 0$$

or $$\frac{\varphi_{ij}^{(n)}(s) - \varphi_{ij}^{(n-1)}(s)}{t_n - t_{n-1}} < -\frac{\varphi_{ij}^{(n)}(s)}{\Delta},$$

wherein
$\phi_{ij}(s) = P_{ij}^{(i,s)}/\gamma_{ij} - I_{ij}(s)$,
wherein $\gamma_{ij}$ denotes the target SINR for link (i,j), $P_{ij}^{(i,s)}$ denotes the received power from i's beacon transmission measured at node j under a specific antenna configuration used by node j to receive from node i in radio resource s, and $I_{ij}(s)$ is associated with the interference power measured for the radio resource s, wherein the processor at node j is part of the first wireless communication device.

9. The first wireless communication device of claim 1, wherein the wireless communication device is configured to allocate the at least one radio resource from the plurality of radio resources for broadcast communication with the second wireless communication device using a two-way handshake process.

10. The first wireless communication device of claim 1, wherein the wireless communication device is configured to allocate the at least one radio resource from the plurality of radio resources for unicast communication with the second wireless communication device using a three-way handshake process.

11. The first wireless communication device of claim 1, wherein the plurality of radio resources comprise a plurality of frequency channels or a plurality of time slots within a radio frame.

12. A method for communicating in a wireless communication network supporting a plurality of radio resources, the method comprising:
   measuring physical layer characteristics associated with a first wireless communication device to determine a plurality of interference powers associated with the plurality of radio resources of the first wireless communication device;
   determining, based at least in part on the plurality of interference powers, conflicting radio resources of the first wireless communication device, the conflicting radio resources being radio resources that are not suitable for communicating with a second wireless communication device;
   transmitting data identifying the conflicting radio resources of the first wireless communication device to the second wireless communication device in the wireless communication network;
   receiving data identifying conflicting radio resources of the second wireless communication device; and
   allocating at least one radio resource from the plurality of radio resources for communicating with the second wireless communication device based on the determined conflicting radio resources of the first wireless communication device and the received data identifying conflicting radio resources of the second wireless communication device.

13. A non-transitory computer readable medium storing a computer program comprising a program code for performing a method for communicating in a wireless communication network supporting a plurality of radio resources when executed on a computer, the method comprising the steps of:
   measuring physical layer characteristics associated with a first wireless communication device to determine a plurality of interference powers associated with the plurality of radio resources of the wireless communication device;
   determining, based at least in part on the plurality of interference powers, conflicting radio resources of the first wireless communication device, the conflicting radio resources being radio resources that are not suitable for communicating with a second wireless communication device;
   transmitting data identifying the conflicting radio resources of the first wireless communication device to the second wireless communication device in the wireless communication network;
   receiving data identifying conflicting radio resources of the second wireless communication device; and
   allocating at least one radio resource from the plurality of radio resources for communicating with the second wireless communication device based on the determined conflicting radio resources of the first wireless communication device and the received data identifying conflicting radio resources of the second wireless communication device.

\* \* \* \* \*